United States Patent [19]

Wernette

[11] Patent Number: 4,624,380
[45] Date of Patent: Nov. 25, 1986

[54] DISPOSABLE LITTER ENCLOSURE

[76] Inventor: H. George Wernette, P.O. Box 219, Blue River, Oreg. 97413

[21] Appl. No.: 804,912

[22] Filed: Dec. 5, 1985

[51] Int. Cl.$^4$ .............................................. B65D 5/46
[52] U.S. Cl. ........................................ 220/6; 220/73; 229/41 R
[58] Field of Search ................... 220/6, 7, 4 F, 80, 73; 229/41 R

[56] References Cited

U.S. PATENT DOCUMENTS

| | | | |
|---|---|---|---|
| 687,968 | 12/1901 | Reber | 229/41 R |
| 3,438,562 | 4/1969 | Connor et al. | 229/41 R |
| 3,659,774 | 5/1972 | Mielke | 220/73 X |
| 4,101,052 | 7/1978 | Dove | 229/41 R X |

Primary Examiner—Steven M. Pollard
Attorney, Agent, or Firm—John F. Ingman

[57] ABSTRACT

A disposable litter enclosure which, in the preferred embodiment, embodies a moisture resistant box containing, in closed form, cat litter and a pre-formed framework for interconnecting the raised side extensions formed from the top of the box. Alternatively, the framework may be attached to the box or otherwise be available. The framework is a continuous, encircling, rim-like member of rectangular shape with a continuous vertical slot formed in its underside, and, where intended to be packaged within the box, is of less dimension than the closed box. The top edges of the side extensions are slipped into the slot of, and thus engage with, the framework to provide a continuous rigid support connecting the tops of the extended sides. The side extensions of the box, where the framework is packaged therein, are tapered to permit joining at the framework without gaps where adjacent side edges of the side extensions meet. The framework may have its inside flange extended as a leading edge so as to intercept the top edges of the side extensions and guide them into the framework. A small perforated push-out area may be provided on the lower portion of a side extension for small kittens, if needed.

2 Claims, 8 Drawing Figures

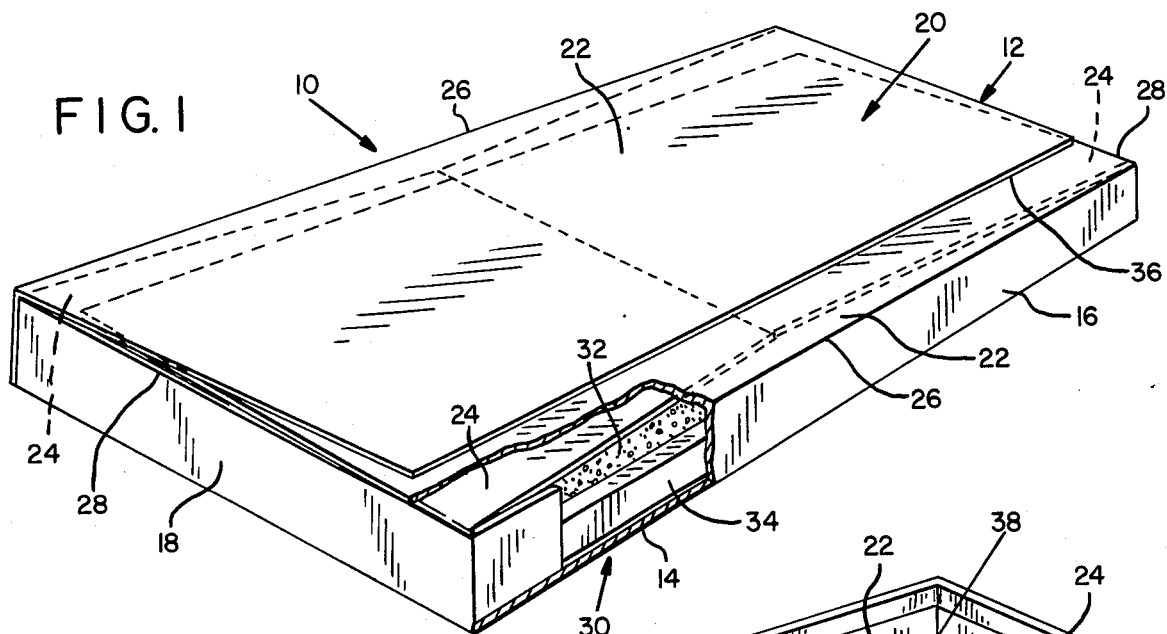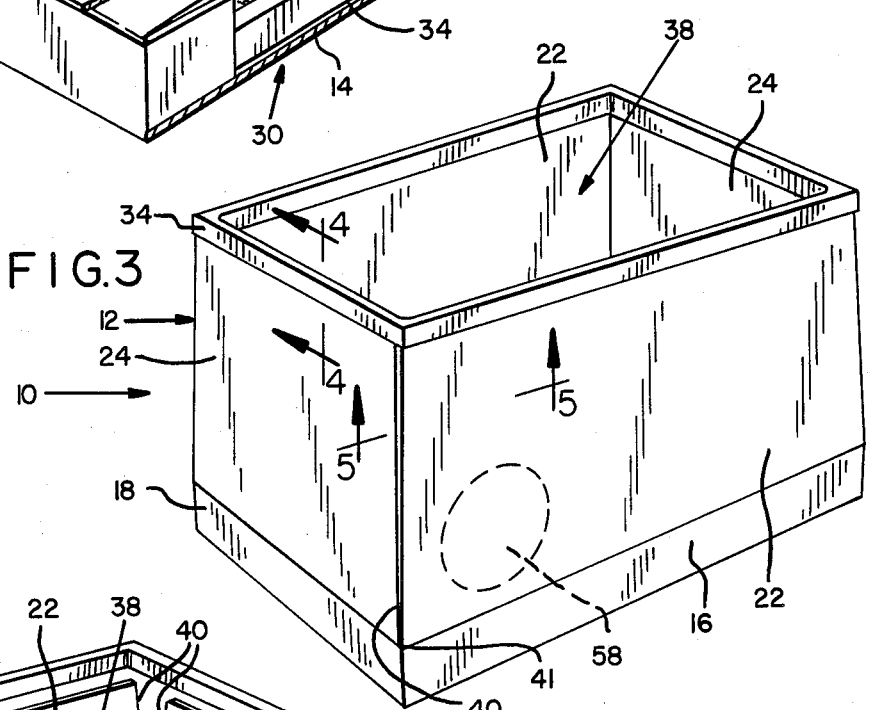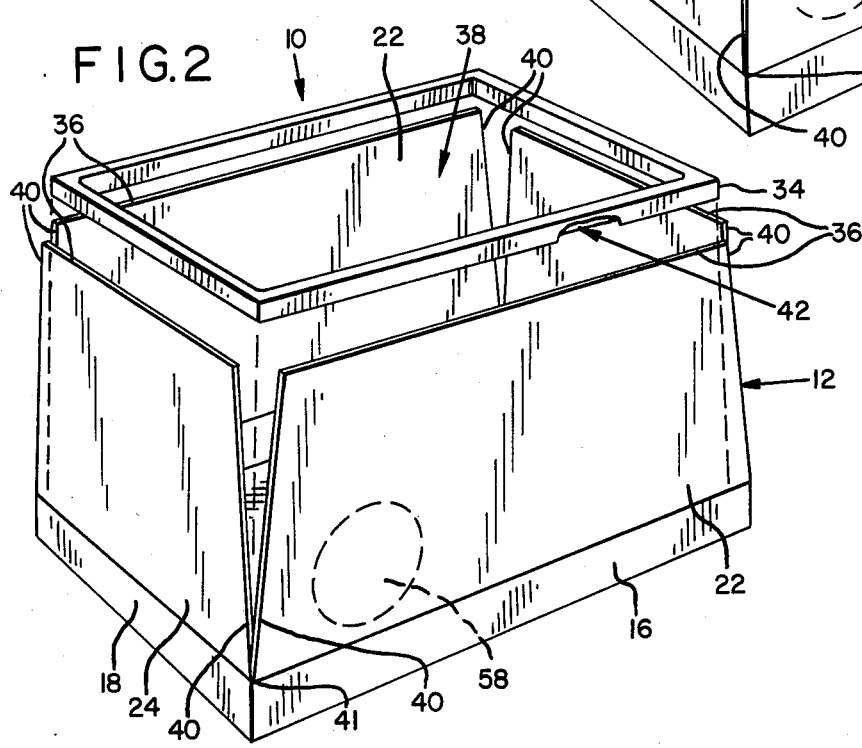

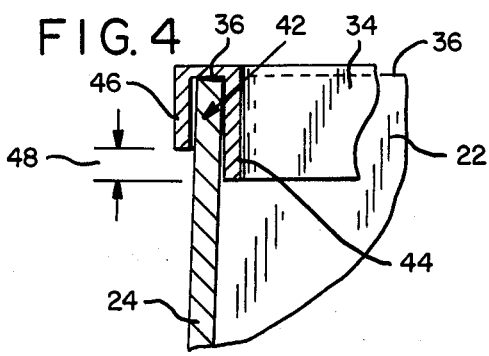
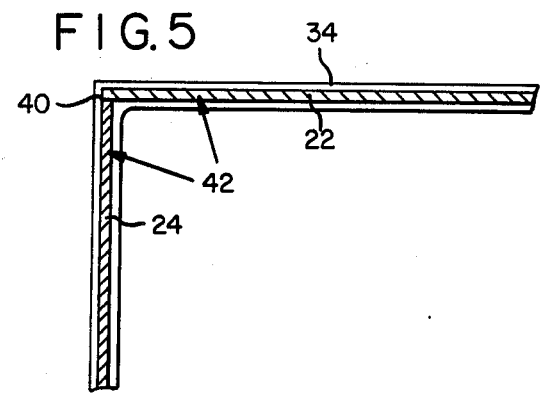
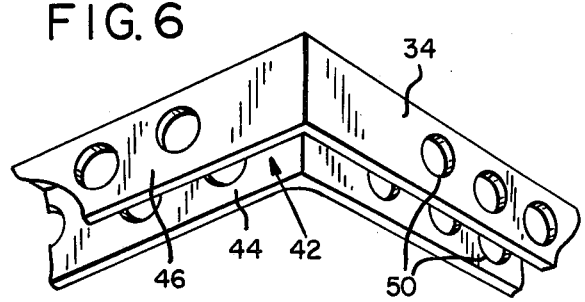
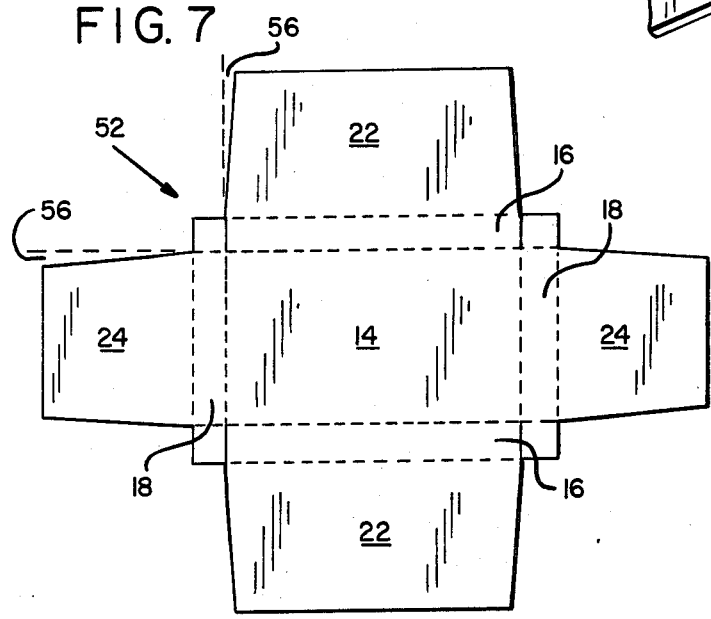
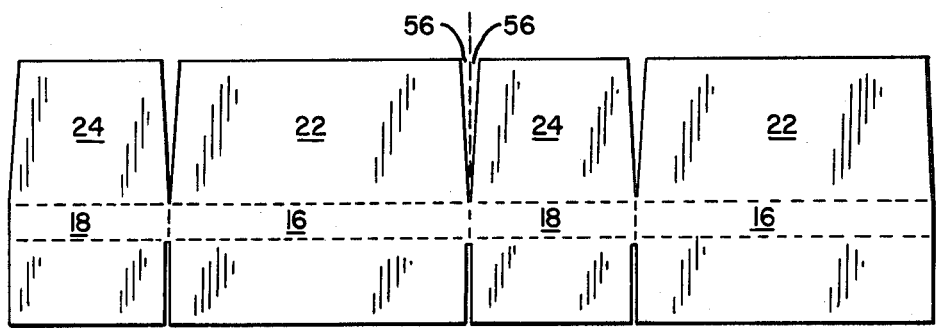

4,624,380

DISPOSABLE LITTER ENCLOSURE

BACKGROUND OF THE INVENTION

1. Field of the Invention

The present invention generally relates to litter boxes for cats and more particularly is concerned with a disposable litter enclosure which utilizes a separate framework for structural support of its side extensions when in use.

2. Description of the Prior Art

Cat litter boxes generally are non-disposable, low-sided containers, made of metal or plastic, into which several inches of litter material have been placed. These litter boxes contain the cat litter poorly, especially in face of the proclivity of cats to cast out litter in the process of covering their waste. When the conventional non-disposable cat litter box has been used sufficiently to become objectional, the owner or caretaker of the cat is faced with the unpleasant task of emptying the contents of the litter box, cleaning the box itself, and refilling it with litter, usually by pouring from a large sack. The maintenance of a cat litter box and its surroundings is an objectional task, to be avoided if possible.

Disposable containers have been designed, but have not gained popularity generally because of cost, and complexity in preparation for use and for disposal. Disposable boxes have had edges to fold, perforations to separate, slots to open, and tabs to fit. If tabs were of the non-locking variety, they were liable to come loose in use; if locking tabs were used, they defied unlocking when attempting to quickly dispose of a box with used and objectional litter.

There exists a definite need for a disposable litter enclosure:

which is capable of serving as an effective package or container for the marketing of cat litter, to include both display and shipping;

which can be prepared for use by the cat owner or caretaker with a minimum of time and effort;

which is structurally strong and reliable;

which will retain the litter while in use; and, which can be quickly and easily prepared for sanitary disposal, and disposed of, while containing used cat litter.

SUMMARY OF THE INVENTION

The present invention provides a disposable litter enclosure which is designed to satisfy the aforementioned needs. The invention embodies a box for cat litter which is compact and sturdy, has extended sides interconnected by a framework for retaining the cat litter, and is simple to assemble for use and disassemble for disposal.

Accordingly, the present invention embodies a moisture resistant box, which in closed form may include cat litter and a rectangular pre-formed framework. The framework may be packaged in the box, be attached thereto, or otherwise available. When the box is opened for use, the rectangular framework is used to interconnect raised side-extensions, which are formed from the top of the box so as to present a barrier to retain cat litter when the box is in use. The pre-formed framework is a rim-like member of rectangular shape with a continuous vertical slot formed on its underside. The top edges of the side extensions are slipped into the slot of, and thus engage with, the framework. The framework provides continuous rigid support connecting the top of the extended sides of the open box, and thus a sturdy opening for cats to use in entering and exiting the box.

If the framework is packaged within the box, the framework is of less dimension than the box. In this configuration, the engagement of the top edges of the side extensions with the framework provides a rectangular top opening which is smaller than the dimensions of the closed box. Each side extension therefore is tapered on its side edges to permit joining at the framework without gaps where adjacent side edges of the side extensions meet; the tapering also serves to provide inwardly leaning sides which provide added retention for the cat litter while the box is in use.

The framework holding the side extensions is designed for ease of assembly, and may have its inside flange extended so as to intercept the top edges of the side extension and guide them into the slot of the framework. Upon need for disposal of the cat litter, the framework simply is removed from the top edges of the side extensions, the side extensions folded down to resume their position as the top of the box, and the closed box, with litter, is disposed of.

A perforated push-out area may be provided on a side extension for use by a small kitten, if needed.

BRIEF DESCRIPTION OF THE DRAWINGS

FIG. 1 illustrates the preferred disposable litter enclosure as closed for shipment, marketing or storage, with a cut-out of the box showing the framework and litter inside.

FIG. 2 shows the box of the preferred disposable litter enclosure opened with side extensions raised, preparatory to installation of the framework.

FIG. 3 shows the preferred disposable litter enclosure open and assembled for use, with the framework installed on the side extensions of the box.

FIG. 4 is a cross-sectional view of the framework positioned on a side extension, as at line 4—4 of FIG. 3.

FIG. 5 is an upward cross-sectional view of an installed framework corner, as at line 5—5 of FIG. 3.

FIG. 6 is partial perspective view of a framework corner, also illustrating framework perforations for material saving.

FIG. 7 illustrates a plan view of a preferred unassembled box form.

FIG. 8 illustrates an alternative unassembled box form.

DESCRIPTION OF THE PREFERRED EMBODIMENT

Referring now to the drawings, and more particularly to FIG. 1, there is shown in perspective the preferred embodiment of the disposable litter enclosure 10 in closed form, as would be used for shipping, marketing and storage. The box 12, when assembled, is composed of a rectangular-shaped base 14, two (2) opposing longitudinal sidewalls 16, two (2) opposing transverse sidewalls 18, and top 20. Attached in folding relationship to the sidewalls 16 and 18 respectively are side extensions 22 and 24, which, when folded inwardly at the fold lines 26 and 28 form the top 20 for the closed box 12. The side extensions 24 attached to the transverse sidewalls 18 fold down first, and the side extensions 22, attached to the longitudinal sidewalls 16, fold inward on top of side extensions 24 to provide the outside top 20 of the box 12 when closed. In the closed position, the box 12 may be sealed in any one of a number of conventional ways, a tear-string tape along the exposed top edge 36 of the upper side extension 22 being a preferred method (not shown). In the preferred embodiment of FIG. 1, a cut-away section 30 shows within the box 12, as packaged for use, cat litter 32 and a preformed rectangular framework 34, as will be discussed subsequently. The cat litter 32 may be enclosed in the box 12 in bags or other containers, or may be loose therein as illustrated, the latter being preferred for its instant availability without additional handling.

FIG. 2 shows the disposable litter enclosure 10 prepared for assembly. The folded side extensions 22 and 24 have been straightened to extend from box sides 16 and 18 respectively, and the framework is poised above for engagement. As illustrated in FIG. 1, the framework 34 is packaged within the closed box 12; therefore the dimensions of the framework 34 are less than the those of the box 12. In order for the top edges 36 of side extensions 22 and 24 to fit within framework 34, their length must be lessened. This is accomplished by the tapering of the side edges 40 of the side extensions 22 and 24; such tapering not only allows the top edges 36 to engage the framework 34, but also permits the side edges 40 to continuously abut from their origin 41 to within the framework 34. Continuous abutment of the side edges 40 is necessary to prevent bowing or gaps between adjacent side extensions 22 and 24, and resulting possible dispersal of cat litter 32 outside the box 12. Furthermore, the use of the internally packaged framework 34 with tapered side extensions 22 and 24 provides inwardly leaning walls promote additional retention of the cat litter 32 within the box 12 while in use. In the preferred embodiment, the angle of taper on the side edges 40 of side extensions 22 and 24 is approximately $2\frac{1}{2}$ degrees, this providing approximately $\frac{1}{2}$ inch decrease on each side for the preferred $10\frac{1}{2}$ inch side extension used. Should it be desired that the height of side extension be significantly reduced, the angle of taper would necessarily increase, as would be apparent to the person skilled in the art.

FIG. 3 shows the disposable litter enclosure 10 assembled for use. The framework 34 has been engaged with the top edges 36 of the side extensions 22 and 24 (See FIGS. 2, 4 and 5) to provide a sturdy, continuous, enclosing rim about a vertically extended top opening 38 which is now available for cats to enter or exit.

Although the preferred embodiment illustrates the framework 34 as being packaged within box 12, the scope of this invention is not so limited. A framework 34, not packaged within box 12, may externally accompany or otherwise be available for use in forming a disposable litter enclosure 10. For example, a framework 34 could be formed to correspond to the size of the rectangular base 14. In this configuration, side extensions 22 and 24 in normal, non-tapered, rectangular shape, are straightened vertically from box sides 16 and 18 respectively, with side edges 40 in vertical abutment, for engagement of the top edges 36 with the framework 34. While this configuration is not specifically illustrated, it is believed to be clear in view of the figures illustrating the preferred embodiment and the foregoing discussion.

The framework 34 itself is a pre-formed rim-like member of rectangular shape with a continuous vertical slot 42 formed in its underside, when oriented as shown in FIG. 2 and FIG. 3. The framework 34 is preferably made of polystyrene, although other materials, to include pressed paper, could be used. FIGS. 4, 5, and 6 provide sectional or partial views of the framework 34. FIG. 4 shows a cross section, as viewed at line 4—4 of FIG. 3 where the framework 34 is engaged with the top edge 36 of the side extensions 22 and 24, as for use.

The top edge 36 of the side extensions 22 and 24 fit closely into the slot 42 formed. The flanges of the inverted "U" shaped cross-section defining the slot 42 are not of equal length; the inside flange 44 of the framework 34 extends downward further than the outside flange 46. This extended inside flange 44 proves to be very useful in the mounting of the framework 34. The inside flange 44 serves as a leading edge to guide the top edges 36 into the slot 42 and thereby make engagement of the framework 34 into the side extensions 22 and 24 an easy matter. While various lengths of framework depth are suitable, the preferred length of the outside flange 46 is $\frac{3}{8}$ inch, with an inside flange 44 extending past the outside flange 46 by $\frac{1}{8}$ inch, as is shown at 48.

FIG. 5 shows a partial view of a portion of the framework 34, as viewed from below and encompassing a corner section of the framework 34 with the side edges 40 of the side extensions 22 and 24 in contact. The framework 34 holds the side edges 40 of adjacent side extensions 22 and 24 in abutted position, this being necessary so that litter does not escape, as discussed previously.

FIG. 6 shows a perspective view of the framework 34 corner, again illustrating the leading inside flange 44 and, in addition, showing an alternative configuration of the framework 34 itself wherein perforations 50 have been formed in the framework for the purpose of saving weight and material without significantly reducing the strength thereof. Many variations of framework design are possible wherein weight and material savings may be made; the configuration of FIG. 6 is merely an example thereof.

Finally, FIG. 7, and FIG. 8 show flat layouts or blanks of two (2) box designs 52 and 54, out of many possible, which are suitable for the preferred embodiment of the disposable litter enclosure 10. The box design 52 of FIG. 7 is a preferred design because of the single piece base 14 which assists in precluding leakage. FIG. 8, however, is included as a possible alternative configuration; such box design 54 is more efficient in that it permits a greater number of box blanks from a given amount of cardboard or linerboard. The manner of folding and assembly of these blanks into boxes is not provided here, this being a matter which is clearly within the knowledge of the person skilled in the art. The box materials in the preferred embodiment are conventional cardboard or linerboard with moisture resistance added, particularly at the base, either by inside acrylic coating or other conventional method.

The design of the boxes of FIG. 7 and FIG. 8 differ from conventional design of boxes in that the side extensions 22 and 24 are tapered so as to permit the application of the framework 34 packaged within the box 12, as has been discussed above. In the preferred embodiment, a box with an assembled length of 21 inches, width of $11\frac{1}{2}$ inches, sidewall height of $2\frac{1}{2}$ inches and an extended side height of $10\frac{1}{2}$ inches has been found to provide excellent results. Other dimensions may also be satisfactory. As indicated previously, with the $10\frac{1}{2}$ inch side extension, an approximate $2\frac{1}{2}$ degree taper is preferred, as is shown at 56.

It is should be noted that there are a number of other box designs which will form a disposable litter enclosure utilizing a packaged framework within the scope of this invention, the box designs 52 and 54 of FIG. 7 and FIG. 8 being representative thereof. Similarly, there are numerous box designs which would be compatible with a non-contained framework 34 where the dimensions of the framework 34 match those of the rectangular base 34, as noted above.

The manner of use of the disposable litter enclosure 10 is simple. The sealed box 12 is opened by the user and the side extensions 22 and 24 are unfolded to an approximately vertical position. The user then takes the framework 34 and engages its slot 42 onto the top edges 36 of the side extensions 22 and 24. The engaged framework having provided a sturdy, continuous, enclosing ring about a top opening 38, the disposable litter enclosure 10 is ready for use. Upon use and need for disposal, the framework 34 is lifted and disengaged from the top edges 36, the side extensions 22 and 24 are refolded down to form the top 20, and the box 12, with contents, is disposed of.

Returning to FIG. 2 and FIG. 3, there is shown on side extension 22 a circular perforated push-out area 58. This push-out area 58 is designed as an optional doorway specifically for small kittens who may be desired to use the facility, but have not developed sufficent strength to boost themselves over the extended side of the box 12. Such perforated push-out area 58, if used, would be located as shown along side extension 22, which would be generally out of the way of the major fore and aft casting of litter by cats.

It is thought that the disposable litter enclosure of the present invention and its many attendant advantages will be understood from the foregoing description and that it will be apparent that various changes in form, construction and arrangement of the parts thereof may be made without departing from the spirit and scope of the invention or sacrificing all of its material advantages, the form hereinbefore described being merely an exemplary embodiment thereof.

I claim:

1. A disposable litter enclosure, as for cats, comprising:
    (a) a box having, when assembled:
        (1) a horizontal rectangular base;
        (2) two pairs of opposite vertical sides, each extending upward from an edge of the horizontal rectangular base and joined together as a box, and each vertical side having a horizontal top edge;
        (3) two pairs of opposite side extensions, each having a top edge, a bottom edge, and two side edges, the bottom edges continuing directly from the horizontal top edges of the vertical sides and extending an equal distance to their top edge; the side extensions foldable inward from the vertical sides to form a horizontal top to the box when said box is closed; and
        (4) said side extensions tapering, at both side edges, from their bottom edges inwardly to their top edges, so that when the box is open with the side extensions upwardly unfolded and the tapered side edges abutted, the top edges of the two (2) pairs of opposite side extensions will form a horizontal rectangular perimeter of less dimension than, and centered above, the said rectangular base of the box; and
    (b) a pre-formed, continuous, encircling framework, dimensioned to fit within and be contained by the said box when closed, which framework includes a continuous vertical slot for engagement of the said rectangular perimeter of side extension top edges, the length, width and depth of the slot being dimensioned so that it fits closely over the top edges of the side extensions when in rectangular perimeter form so as to maintain them in said tapered side-edge abutment;
    said framework comprising an inside downward extending flange, an outside downward extending flange, and a continuous connecting top joining the said inside and outside flanges so as to present a continuous slot of inverted "U"-shaped cross section;
    said framework providing continuous rigidity and structural integrity between the individual side extensions.

2. The disposable litter enclosure recited in claim 1 above, wherein the said inside flange of said framework extends downward past the said outside flange, so as to provide a leading edge to guide the top edges of the side extensions into the slot of the framework during engagement of the framework upon the box.

* * * * *